United States Patent [19]

Gancy

[11] E Patent Number: Re. 32,609

[45] Reissued Date of Patent: Feb. 23, 1988

[54] CONTINUOUS PROCESS FOR THE MANUFACTURE OF CALCIUM MAGNESIUM ACETATE DEICER

[76] Inventor: Alan B. Gancy, 265 Robineau Rd., Syracuse, N.Y. 13207

[21] Appl. No.: 4,384

[22] Filed: Nov. 6, 1986

Related U.S. Patent Documents

Reissue of:

[64] Patent No.: 4,606,836
Issued: Aug. 19, 1986
Appl. No.: 693,664
Filed: Jan. 22, 1985

[51] Int. Cl.[4] ..... C09K 3/18

[52] U.S. Cl. ..... 252/70; 106/13; 423/155; 423/173; 423/430; 423/637; 562/607; 562/608

[58] Field of Search ..... 106/13; 252/70; 423/155, 173, 430, 637; 562/607, 608

[56] References Cited

U.S. PATENT DOCUMENTS 4,444,672 4/1984 Gancy ..... 252/70

4,488,978 12/1984 Gancy ..... 252/70

*Primary Examiner*—Robert Wax

[57] ABSTRACT

Finely divided lime, at any degree of slaking, is introduced in a steady stream into an agitated reactor designed to produce pellets or aggregates. Concentrated acetic acid is simultaneously introduced in a steady stream at a rate equal to the chemical combining rate required to produce calcium magesium acetate. Water content of the reaction stream is critical; the mol ratio of water, including water of neutralization, to the calcium magnesium acetate product must fall in the range 3.3–7.0 in order to form the desired pellets and to avoid sticking, caking, and dust emanation from the reactor. Product pellets are drawn off in a stream from the reactor and dried for use as a non-polluting roadway and walkway deicer. Traction agent is optionally incorporated into the deicer pellets by introducing a steady stream of traction agent to the reactor simultaneous with raw materials introduction. Magnesium-to-calcium ratios greater than one are achieved by blending dolime with magnesium-rich ore.

14 Claims, No Drawings

CONTINUOUS PROCESS FOR THE MANUFACTURE OF CALCIUM MAGNESIUM ACETATE DEICER

Matter enclosed in heavy brackets [ ] appears in the original patent but forms no part of this reissue specification; matter printed in italics indicates the additions made by reissue.

BACKGROUND OF THE INVENTION

Calcium magnesium acetate (CMA) has emerged in recent years as the only viable non-polluting replacement for salt, or sodium chloride, as a roadway and walkway deicer. Research and development of CMA by the states as well as the federal government is being actively pursued. In one of my previous inventions relating to CMA, I discovered a means of producing a coarse-particle product which is mandatory as concerns the practical ice-melting mechanism (U.S. Pat. No. 4,488,978). The present invention relates to palpable improvements in that process, with attendant economies.

DESCRIPTION OF PRIOR ART

Prior to the advent of U.S. Pat. No. 4,488,978, the only processes extant for producing a commercially acceptable form of CMA for deicing were (1) spray-drying and (2) flaking. The former had indeed been materialized in a recent effort sponsored by the Federal Department of Transportation. Flaking has been proposed in writing in connection with such sponsored work, but to the best of my knowledge, it has not been reduced to practice.

Spray-drying of CMA solution has proved to produce an inferior quality CMA. Firstly, hydrolysis of the CMA during the spray-drying process is extensive, being accelerated both by heat and by the considerable amount of water present in the 25% w/w solution of CMA used as feed. Such hydrolysis not only leads to an alkaline product, but it also gives rise to considerable insolubles in the form of oxides, basic acetates, and perhaps even carbonates. Insolubles are ineffective in the ice-melting function, and represent a process/-product inefficiency. Furthermore, these insolubles are manifest as a flocculant mass, which effectively inhibits diffusion of the soluble electrolyte and renders the ice-melting process sluggish. In fact, in actual ice-melting tests performed under strict laboratory control, the spray-dried CMA product was considerably inferior to the product made according to U.S. Pat. No. 4,488,978. And finally, the CMA product of spray-drying is relatively friable.

As for process economy, spray-drying suffers the disadvantage of having to evaporate approximately 50 mols of water per mol of CMA. The process of U.S. Pat. No. 4,488,978 requires the evaporation of only approximately 3 mols of water per mol of CMA. Thus there are considerably savings in going from spray-drying, or any solution-based process for that matter, to the inventions which I have introduced.

The process of U.S. Pat. No. 4,488,978 reacts slaked lime with concentrated acetic acid in an apparatus designed to produce damp pellets. These pellets are then dried in a special way so as to produce a hard, non-friable, non-brittle pellet which is ideal in size for ice-melting. Inherent in the operation is a narrow particle size distribution of product, again more favorable to the ice-melting mechanism than the usual wide distribution such as, for example, that found in commercial rock salt deicer.

Whereas the process of U.S. Pat. No. 4,488,978 represents a major advance in the art of CMA deicer production, there are drawbacks in the scaling up of the process, to levels of 10,000 tons per year, for example. Firstly, it is a batch process. This is not undesirable per se; many major inorganic industrial processes are batch. In this case, however, the batch nature of the process carries with it the disadvantage of physical problems in actually achieving the desired product size distribution. This is manifest as the production of extremely large agglomerates during the course of the reaction, prior to completion. These agglomerates must be broken up, with attendant higher energy input, to the appropriate particle size. Furthermore, the breaking of large agglomerates is a time-dependent phenomenon, undoubtedly due to the relatively slow rate of reaction of the MgO component with acetic acid, as well as to the formation of intermediate CMA hydrates en route. In short, the process is not smooth when carried out on an industrial scale, and presents severe difficulties.

In the execution of experiments which culminated in U.S. Pat. No. 4,488,978 I always conducted the batch reaction by charging the reactor with the complete complement of lime, and then slowly adding acetic acid, with agitation. The slow addition of lime to the complete complement of acid was tried, but unsuccessfully. It is readily appreciated that in this batch process, at any point along the reaction path there exists, in general, a mixture of raw material, intermediate(s) and product. In some cases this type of mixture is advantageous to the successful realization of the process on a large scale; for example, raw material can act as a diluent to the product, and thereby effect a favorable physical consistency of the batch. I have discovered that in the process of U.S. Pat. No. 4,488,978 however, the existence of the general mixture is unfavorable to its large scale processing. Whereas the process is ultimately workable, and does indeed produce a superior result, processing difficulties are formidable, and have forced an investigation into an improved approach. Such an approach has been successfully realized, and has resulted in the present application for patent. The improved process is adaptable to a continuous, as well as to a batch (semi-batch) mode of operation. This is significant in that continuous processes can lead to high production rates with relatively lower capital and operating costs.

Another inherent drawback to the process of U.S. Pat. No. 4,488,978 is that it can only utilize slaked lime raw material. Use of unslaked lime, with its attendant exothermicity, always led to an insurmountable dusting problem in the course of the manufacture. The uncontrolled exothermicity led to losses of expensive acetic acid through volatilization. The successful use of unslaked lime in the present invention obviates both dusting and acid volatilization problems, thus reducing costs of lime raw materials, even though these are not major reductions, but perhaps more importantly conserving costly acetic acid. All savings are welcome in connection with a chemical product which has to compete with rock salt. Additionally, the ability to use unslaked as well as slaked lime adds to processing versatility, and sometimes this in itself can lead to cost savings, albeit indirectly. The invention of the instant application inherently allows utilization of unslaked as well as slaked lime raw materials, and this was an unanticipated beneficial outcome.

OBJECTS OF THE INVENTION

One object of the invention is to provide an economical, industrially feasible process for the production of a non-polluting calcium magnesium acetate deicer.

It is the further object to produce a water-soluble calcium magnesium acetate deicing agent in the form of a coarse particle, or pellet, ideally suited to ice-melting on walkways and roadways.

Yet another object of the invention is to produce a relatively non-friable calcium magnesium acetate pellet which can be stored, shipped and dispensed with relatively little degradation to fines.

A still further object of the invention is to provide a manufacturing process for production of coarse-particle calcium magnesium acetate, which requires a minimum of processing energy for product drying.

A further object is to produce a superior calcium magnesium acetate deicer by reacting unslaked as well as slaked lime with acetic acid, which reaction is characterised by the absence of recycle streams, waste products or by-products.

Another object is to provide a direct and continuous one-step process for the conversion of lime and acetic acid to damp calcium magnesium acetate coarse particles, which is then followed by controlled drying of said damp particles.

A still further object of the invention is to provide a means of producing a particular chemical and physical manifestation of calcium magnesium acetate, which exhibits superior ice-melting properties.

It is also an object of the invention to provide an economical, smooth-running manufacturing process for the production of coarse-particle calcium magnesium acetate deicer in which traction agent is incorporated.

SUMMARY OF THE INVENTION

Finely divided lime, slaked or unslaked, is fed at a controlled, constant rate to a reactor provided with a means of agitating the reaction batch; simultaneously, concentrated acetic acid is fed to the same reactor at a controlled, constant rate which is equal to the stoichiometric combination rate in relation to that of the lime. The raw materials may be fed into an empty reactor until such reactor is filled with damp intermediate product, and this has the designation semi-batch. Alternatively, raw materials may be fed to an agitated reactor possessing sufficient residence time to complete the chemical reactions and form the desired damp coarse particles, while such particles are continuously drawn off from the reactor. This is a straightforward continuous process. In either case, damp coarse intermediate product is dried in a conventional manner until sufficient of the water (and contained excess acetic acid) are driven off. A slight excess of acid is desirably fed to the reactor, up to 5%, in order to promote timely completion of the reaction so as to minimize the appearance of unreacted, insoluble lime in the final product. Excess acid is also utilized in order to suppress the hydrolysis during drying which produces undesirable, insoluble hydrolysis products:

$$\text{CMA} + \text{water} \xrightarrow[\text{temperature}]{\text{elevated}} \text{lime,}$$

-continued basic acetate, carbonate + acetic acid.

When the lime contains magnesium in any significant amount, slaking can be carried out at atmospheric pressure, in which case only the calcium oxide component will be converted to its corresponding hydroxide. With dolomitic lime, for example, the idealized reaction is:

$$CaO.MgO + H_2O \rightarrow Ca(OH)_2.MgO.$$

This may be termed "partial slaking". Alternatively, slaking can be performed at elevated pressure so as to convert MgO as well:

$$CaO.MgO + 2H_2O \xrightarrow{\text{Pressure}} Ca(OH)_2.Mg(OH)_2.$$

This may be termed "complete slaking".

It is at once evident that processing cost savings are realized in the process of this invention through its ability to accommodate unslaked lime.

The process of invention proceeds smoothly, with neither caking nor sticking. The reaction batch is observed to be free-flowing at all times, with instant conversion to and maintenance of the desired particle size distribution in the batch, whether the operation is semi-batch or continuous. This is in sharp contrast to the process of U.S. Pat. No. 4,488,978, wherein considerable time and energy must be devoted to breaking up the large agglomerates of the batch to achieve the desired particle size distribution, and to scraping product from the reaction vessel.

Furthermore, the process of invention is easily executed using unslaked lime, without the undesirable emanation of process dust or acid vapors. This also contrasts with the process of U.S. Pat. No. 4,488,978, wherein serious dust problems and acid volatilization were never overcome, attempts to do so by increasing the proportion of water only aggravated the aforementioned caking and sticking problem.

Thus, I have discovered a means of overcoming serious processing difficulties associated with the prior art by feeding raw materials simultaneously to an agitated reactor, wherein the raw material rate ratio is held equal to the stoichiometric combination ratio.

The process of invention is also eminently adaptable to the incorporation of insoluble traction agent into the finished product. Low cost materials such as cinder, sand or limestone of the desired particle size distribution are introduced into the reaction medium in a separate stream, or in admixture with lime raw material.

The invention also accommodates a wide range of natural limes ranging in magnesium content which is very low, to dolomitic lime where the Mg/Ca mol ratio approaches unity. Inasmuch as magnesium acetate is inherently a better deicer than calcium acetate, it is desirable to utilize a raw material which is as rich in Mg as possible. As may be readily appreciated by those skilled in the art, blends of lime may also be utilized in the present invention.

A key feature of the invention is the dilution of the acetic acid with water. The latter may be introduced into the reactor as a separate stream, constant and controlled, while a concentrated acetic acid including glacial may be introduced separately. Or, the water and acid may be pre-mixed and then fed to the reactor as a single stream. Too little water leads to a higher batch temperature, dust emanation, and difficulty in controlling damp product particle size distribution. Too much water leads to a sticky reaction batch which is difficult to process, and even if it were processable, unnecessarily high energy would be required for product drying. I have discovered a workable range of water content in the reaction medium as defined in the following expression as it applies, for example, to dolomitic lime:

$$CaO.MgO.xH_2O+4HAc+yH_2O \rightarrow CMA \text{ product, where } o \leqq x \leqq 2, \text{ and } (x+y) \approx 3.$$

The precise water input will depend upon the reactor configuration as it relates to the amount of water which is allowed to evaporate from the reaction medium, where evaporation is driven by reaction exothermicity. Note that 2 mols of water will be introduced via the acetic acid upon completion of the reaction.

Product drying is carried out in the temperature range 100°–150°, where the lower temperature is preferred. Drying times will depend upon the configuration of the dryer, and also the desired amount of residual water in the product, and therefore no attempt is made to define drying times precisely. I have discovered that whereas products approaching calcium acetate in composition do not possess a stable hydration at ambient conditions, the product derived from dolomite, i.e. where the Mg/Ca mol ratio in the product approaches unity, will hold approximately 2 waters of hydration under normal ambient conditions. Whether this composition ideally represented as $$Ca(Ac)_2.Mg(Ac)_2.2H_2O$$

is a true hydrate or merely a metastable state of hydration is unknown. Nonetheless, the 2 waters are held apparently indefinitely in ambient storage. This fact, then, provides the option of drying the reaction product essentially all the way to the anhydrous state, or drying the (Mg/Ca=1) product only to the "dihydrate" state. While the latter option requires less energy, there is the trade-off concerning shipping weight of the final product. The "dihydrate" is free-flowing, non-sticking and non-caking. At higher relative humidities, over 90%, products have apparently stabilized at degrees of hydration as high as 3.5, and are also dry and free-flowing.

Thus, when drying to the "dihydrate", as little as 3 mols of water per mol of CMA need be driven off in the process of this invention. This represents a dramatic distinction over all prior art in this area.

DESCRIPTION OF PREFERRED EMBODIMENTS

The following examples will illustrate the embodiment of the invention:

EXAMPLE I

Dolomitic lime is first partially slaked at ordinary pressure and then converted to CMA.

A. Slaking of Lime 255.1 g of lime, pass 100 mesh, and containing 57.12% CaO, 39.58% MgO was placed in a 6-quart Hobart blender. Over the space of 5 minutes, 91.8 g of water was added to the lime, with low-speed stirring. When reaction was complete and the batch cooled, 52.3 g of water was retained. The slaked lime was stored for use.

B. Reaction Heel 77.1 g dry CMA pellets from a previous preparation were placed in a 6-quart Hobart blender. To this CMA was added 9.3 g of water, slowly and with low speed stirring. The product of this hydration was dry, free-flowing, and non-sticking, and conforms to a formal dihydrate composition.

C. Semi-batch Reaction 86.4 g of the above heel were placed in a 6-quart Hobart blender. To this heel was added 153.7 g slaked lime at a constant rate of about 3.07 g/minute, with low-speed agitation. Simultaneously, 352.4 g of an 87% w/w solution of acetic acid in water was added at a constant rate of 7.06 g/minute to the Hobart blender.

The product was slightly warm and damp, but free flowing, non-caking and non-sticking. There was little or no odor of acetic acid over the product batch. Product weighed 572.2 g, and was dried at 100° C. until a constant weight of 450.5 g was attained. This represents a 97% yield on raw materials. Approximately 0.7 mols of water per mol CMA were lost during the reaction via evaporation, and another ~4.5 mols were driven off in the 100° C. drying process.

The pH of a ~22% solution of the above product in water was 8.6–9.1, confirming the slight deficiency of reaction input acid. This is also reinforced by the qualitative observation of some finely divided insolubles in the solution, probably unreacted lime in addition to the normal amount of lime insolubles.

Product was dry, free-flowing, non-dusting, and non-caking. Particle size centered about approximately pea-size.

EXAMPLE II

Unslaked dolomitic lime is converted directly to CMA.

To a 6-quart Hobart blender was added 86.4 g CMA "dihydrate" as heel. 127.55 g of unslaked lime (57.12% CaO, 39.58% MgO, pass 100 mesh) was added to the Hobart, with slow speed agitation, at the constant rate of 1.82 g/minute. Simultaneously, 375.4 g of 81.6% acetic acid in water was added to the Hobart at a constant rate of about 5.38 g/minute. The warm product was free-flowing, non-caking and non-sticking. No dust emanation occurred throughout the run. A slight acetic acid odor characterises the damp product.

Damp product was dried at 100° C. to a constant net weight of 445.6 g, which represents a 96% yield on raw materials.

A 22% solution of dried product has a pH of 7.6–8.0, reflecting a better consumption of lime than in Example I. This is reinforced by a qualitatively observed lower level of insolubles in the solution.

Product physical characteristics were the same as that of Example I in all respects excepting that the mean particle size was slightly smaller.

EXAMPLE III

Three separate preparations of CMA were made using dolomitic lime and 100% of the stoichiometric requirement of acetic acid. Damp warm products were each allowed to cool and dry at room temperature, to constant weight (62°–68° F.; 60–70% RH). The degree of hydration was then calculated in each case from final product weights. The results were:

| Sample Number | Mols Water/Mol CMA |
|---|---|
| 1 | 1.8 |
| 2 | 2.1 |

-continued

| Sample Number | Mols Water/Mol CMA |
|---|---|
| 3 | 2.0 |

The "dihydrate" in each case was dry, free-flowing, non-sticking and non-caking. The constant weights were maintained apparently indefinitely within this humidity range. At higher humidities, degree of hydration has stabilized at ~3.5.

EXAMPLE IV

Sand was incorporated into CMA.

A single preparation of CMA was made from dolomitic lime and CMA. To the lime was previously added sufficient washed, dried No. 2 sand to comprise 50% of the final CMA product, anhydrous basis.

Product was dried to constant weight at 100° C. It was indistinguishable in physical appearance from CMA containing no sand. Product pellets were free-flowing and non-friable. Evidently, the sand is incorporated into pellet interiors. Such product is useful as a combined deicer and traction agent.

Acid, anhydrous basis, is always introduced to the reaction vessel relative to the active ingredients in lime according to their chemical combining ratios. Thus in the case of a lime which hypothetically contains no magnesium, the chemical combination is expressed $$CaO + 2HAc + \text{water} \rightarrow \text{product},$$

and the weight ratio of acid to lime is 120.1/56.08. This ratio is then appropriately modified to take into account the extent of slaking of the lime, the non-reactive impurities in the lime, and the extent of acid dilution.

In the same way the chemical combination of dolomitic lime with acetic acid is expressed:

$$CaO.MgO + 4HAc + \text{water} \rightarrow \text{product},$$

and the weight ratio of acid to lime to be maintained in the raw material streams is 240.2/96.40 before adjusting for known impurity and water inputs.

On a laboratory scale, the Examples illustrate that the well known Hobart type blender is capable of producing the desired product of invention. The Hobart blender incorporates a rotating blade which moves in a planetary motion around the inside of the bowl. The shape of the blade relative to the bowl, and the clearance between blade and bowl has been highly evolved through years of exhaustive testing, development, and use. The present invention, however, is not limited or restricted according to the mechanical device employed as a reaction vessel. Indeed, on an even smaller scale my invention can be successfully practiced using laboratory beakers and manual stirring with a spatula. On an industrial scale, the so-called disc type or drum type pelletizers, well known industrial machines, have been successfully used to carry out the present invention.

Ratios of magnesium to calcium greater than one are achievable using the present process of invention. This is accomplished by blending magnesium-rich ore with the dolime prior to its introduction to the reactor. However, the incorporation of extra magnesium requires two modifications to the process: (a) the feed ratio to the reaction bed must be slower than in the Mg/Ca=1 case, and (b) more water must be used in the reaction to facilitate the full utilization of the ores.

Active magnesia, magnesium hydroxide, calcined magnesite ($MgCO_3$) and half-calcined dolomite ($MgO.CaCO_3$) are all suitable to be blended with dolime. The following example illustrates the synthesis of an acetate product in which the Mg/Ca mol ratio equals 2.

EXAMPLE V

A sample of dolomite was calcined at 500° C. to constant weight. Weight loss agreed with the conversion to $CaCO_3.MgO$, commonly known as half-calcined dolomite. 291 parts of this pass-100 mesh material was blended with 200 parts pass-100 mesh dolime.

To the dry solids was added all at once a solution containing 747 parts glacial acetic acid and 262 parts water. Initially there was a large amount of heat evolved, followed by a slower, milder heat evolution. The stirred batch was soft and putty-like, and exhibited a moderate odor of acetic acid. The batch was stirred until pellets formed. In less than 30 minutes the "putty" was transformed into a dense, hard solid, and all odor of acetic acid was gone. The idealized reaction is written:

$$CaO.MgO + MgO.CaCO_3 + 6HAc + 7H_2O \rightarrow \text{Product}$$

Although this invention has been described in connection with specific forms thereof, it will be appreciated by those skilled in the art that a wide variety of equivalents may be substituted for those specific elements and steps of operation shown and described herein, that certain features may be used independently of other features, and that parts may be reversed, all without departing from the spirit and the scope of this invention as defined in the appended claims.

I claim:

1. A process for the manufacture of coarse-particle calcium magnesium acetate characterised in that aqueous acetic acid is combined with the stoichiometric requirement of lime in a suitable agitated reaction vessel, wherein the water content of the reaction mass is critically controlled [such that the mol ratio of water to calcium acetate in said reaction mass does not exceed about 3.3,] and the resulting damp product of reaction is dried to produce the final product, the improvement comprising:

(a) introducing finely divided lime at a constant rate to said agitated reaction vessel:

(b) simultaneously introducing concentrated aqueous acetic acid solution at a constant rate to said reaction vessel wherein the ratio of acid rate, anhydrous acid basis, to the lime rate, active lime basis, is equal to the stoichiometric chemical combining ratio;

(c) maintaining the mol ratio of water input regardless of source, to the acetic acid input, anhydrous acid basis, within the range 0.75–1.15;

(d) withdrawing the damp, coarse-particle product formed in said vessel at steady-state; and (e) drying the product of Step d.

2. The process of claim 1 wherein said lime is unslaked.

3. The process of claim 1 wherein said lime is partially slaked.

4. The process of claim 1 wherein said lime is completely slaked.

5. The process of claim 1 wherein the mol ratio of magnesium to calcium in said lime is controlled within the range 0–0.1.

6. The process of claim 1 wherein the mol ratio of magnesium to calcium in said lime is controlled within the limits 0.1–1.0.

7. The process of claim 1 wherein the mol ratio of magnesium to calcium in said lime is 1.0.

8. The process of claim 1 wherein essentially all hydrate water is driven off in step e.

9. The process of claim 7 wherein drying is incomplete, to the degree that 0–3.5 mols of water per mol of calcium magnesium acetate are allowed to remain with the product.

10. The process of claim 1 wherein the ratio of acid to lime inputs is 100–1.05 times the stoichiometric chemical combining ratio.

11. A process for the manufacture of coarse-particle calcium magnesium acetate characterised in that aqueous acetic acid is combined with the stoichiometric requirement of lime in a suitable agitated reaction vessel, wherein the water content of the reaction mass is critically controlled [such that the mol ratio of water to calcium acetate in said reaction mass does not exceed about 3.3,] and the resulting damp product of reaction is dried to produce the final product, the improvement comprising:

(a) blending finely divided dolomite lime with a finely divided magnesium-rich ore such that the Mg/Ca mol ratio in the resulting blend falls in the range of 1–2;

(b) introducing said blend at a constant rate to a suitable agitated reaction vessel;

(c) simultaneously introducing concentrated aqueous acetic acid at a constant rate of said vessel, wherein the ratio of acid rate to ore-blend rate is equal to the chemical combining ratio;

(d) maintaining the mol ratio of total water input to acid input within the range of 0.75–1.17;

(e) withdrawing the damp-coarse-particle product formed in said reaction vessel, at steady-state; and (f) drying the product of Step e.

12. The process of claim 1 wherein traction agent is simultaneously introduced into the reaction vessel at a constant rate such that the weight ratio of said traction agent to final dried product falls in the range 10–90%.

13. The process of claim 11 wherein traction agent is simultaneously introduced into the reaction vessel at a constant rate such that the weight ratio of said traction agent to final dried product falls in the range of 10–90%.

*14. The process of claim 11 wherein drying is incomplete, to the degree that 0–3.5 mols of water per mol of magnesium acetate are allowed to remain with the product.*

* * * * *